United States Patent
Zur Loye et al.

(10) Patent No.: US 12,448,928 B2
(45) Date of Patent: Oct. 21, 2025

(54) CONTROL SYSTEM FOR INTERNAL COMBUSTION ENGINE, INTERNAL COMBUSTION ENGINE SYSTEM, AND METHOD OF CONTROLLING INTERNAL COMBUSTION ENGINE

(71) Applicant: Cummins Power Generation Inc., Minneapolis, MN (US)

(72) Inventors: Axel O. Zur Loye, Columbus, IN (US); Daniel J. Mohr, Scipio, IN (US); Andrew Guy Kitchen, Daventry (GB)

(73) Assignee: Cummins Power Generation Inc., Minneapolis, MN (US)

( * ) Notice: Subject to any disclaimer, the term of this patent is extended or adjusted under 35 U.S.C. 154(b) by 4 days.

(21) Appl. No.: 18/583,662

(22) Filed: Feb. 21, 2024

(65) Prior Publication Data

US 2025/0264066 A1   Aug. 21, 2025

(51) Int. Cl.
  *F02D 19/08*   (2006.01)
  *F02D 41/30*   (2006.01)
(52) U.S. Cl.
  CPC ....... *F02D 19/081* (2013.01); *F02D 41/3094* (2013.01); *F02D 2200/0602* (2013.01)
(58) Field of Classification Search
  CPC .............. F02D 41/182; F02D 41/1454; F02D 41/1495; F02D 41/2454
  See application file for complete search history.

(56) References Cited

U.S. PATENT DOCUMENTS

| | | | |
|---|---|---|---|
| 6,994,077 B2 | 2/2006 | Kobayashi et al. | |
| 7,904,233 B2 | 3/2011 | Kweon et al. | |
| 8,195,379 B2 | 6/2012 | Haskara et al. | |
| 9,010,303 B2 | 4/2015 | Moonjelly et al. | |
| 9,670,851 B2 | 6/2017 | De Ojeda et al. | |
| 9,719,457 B2 | 8/2017 | Moonjelly et al. | |
| 10,054,071 B2 | 8/2018 | Allezy et al. | |
| 10,066,572 B2 | 9/2018 | Onder et al. | |
| 10,648,423 B2 | 5/2020 | Doring et al. | |

(Continued)

FOREIGN PATENT DOCUMENTS

DE   10 2007 061 225 A1   6/2009

OTHER PUBLICATIONS

Extended European Search Report on EP Appl. Ser. No. 25158583.2 Dated Jul. 4, 2025 (11 pages).

*Primary Examiner* — John Kwon
(74) *Attorney, Agent, or Firm* — Foley & Lardner LLP

(57) ABSTRACT

A control system for an internal combustion engine structured to operate using at least a first fuel includes at least one sensor configured to sense a condition within at least one cylinder of the internal combustion engine, and a controller operably connected to the at least one sensor. The controller is configured to receive at least one fueling request corresponding to at least the first fuel, send at least one fueling command to at least one injector within the internal combustion engine system corresponding to the at least one fueling request, receive at least one signal from the at least one sensor corresponding to the condition, estimate an actual fueling amount within the internal combustion engine based on the at least one signal, and determine at least one compensation amount corresponding to the at least one injector based on the actual fueling amount.

20 Claims, 4 Drawing Sheets

(56) References Cited

U.S. PATENT DOCUMENTS

| | | | |
|---|---|---|---|
| 2013/0139788 A1* | 6/2013 | Sujan | F02D 41/1495 |
| | | | 123/350 |
| 2013/0186065 A1* | 7/2013 | Jeffrey | F02D 41/1441 |
| | | | 60/285 |
| 2016/0146138 A1* | 5/2016 | Beikmann | B60W 10/11 |
| | | | 701/54 |
| 2016/0160791 A1 | 6/2016 | Fritz et al. | |
| 2017/0268447 A1* | 9/2017 | Surnilla | F02D 41/18 |
| 2017/0268451 A1* | 9/2017 | Pursifull | F02D 41/0077 |
| 2017/0314498 A1 | 11/2017 | Pathan | |
| 2018/0051646 A1* | 2/2018 | Ranga | F02D 41/402 |
| 2018/0051647 A1* | 2/2018 | Ranga | F02D 41/26 |
| 2020/0003137 A1* | 1/2020 | Pedder | F02D 19/081 |
| 2021/0071596 A1 | 3/2021 | Atterberry et al. | |

\* cited by examiner

CONTROL SYSTEM FOR INTERNAL COMBUSTION ENGINE, INTERNAL COMBUSTION ENGINE SYSTEM, AND METHOD OF CONTROLLING INTERNAL COMBUSTION ENGINE

TECHNICAL FIELD

The present disclosure relates generally to internal combustion engine systems and methods of controlling internal combustion engine systems.

BACKGROUND

In an internal combustion engine system including a multi-cylinder engine (e.g., compression ignition or spark ignition internal combustion engines, etc.), fuel flow rates and fuel substitution rates (i.e., in the case of a dual fuel engine) affect engine output. Improper fuel injection due to fuel injector drift can cause engine damage and/or decreased engine performance.

SUMMARY

One aspect of the present disclosure relates to a control system for an internal combustion engine. The internal combustion engine is structured to receive at least a first fuel. The control system includes at least one sensor configured to sense a condition within at least one cylinder within the internal combustion engine; and a controller operably connected to the at least one sensor. The controller is configured to receive at least one fueling request corresponding to at least the first fuel; send at least one fueling command to at least one injector within the internal combustion engine corresponding to the at least one fueling request; receive at least one signal from the at least one sensor corresponding to the condition; based on the at least one signal, estimate an actual fueling amount within the internal combustion engine; and determine at least one compensation amount corresponding to the at least one injector based on the actual fueling amount.

Another aspect of the present disclosure relates to an internal combustion engine system. The internal combustion engine system comprises an internal combustion engine comprising a plurality of cylinders; a first injector configured to inject a first fuel and a second injector configured to inject a second fuel into at least one cylinder of the plurality of cylinders; and a control system configured to control the internal combustion engine. The control system comprises at least one controller configured to send at least one fueling command to at least one of the first injector or the second injector; estimate an actual fueling amount within the internal combustion engine based on a signal received from the at least one cylinder of the plurality of cylinders; estimate a fueling amount for the first fuel based on the actual fueling amount; and estimate a fueling amount for the second fuel based on at least one of the actual fueling amount or the fueling amount for the first fuel.

Yet another aspect of the present disclosure relates to a method of controlling an internal combustion engine. The method comprises receiving, by at least one controller, at least one fueling request; wherein the at least one fueling request comprises a first fueling request and a second fueling request, the first fueling request corresponding to a first fuel and the second fueling request corresponding to a second fuel. The method further comprises determining, by the at least one controller, a first fueling compensation amount for the first fuel; determining, by the at least one controller, a second fueling compensation amount for the second fuel; and determining, by the at least one controller, a first fueling command corresponding to the first fuel based on the first fueling compensation amount and a second fueling command corresponding to the second fuel based on the second fueling compensation amount. Each of the first fueling compensation amount and the second compensation amount are based on at least one pressure within at least one cylinder of a plurality of cylinders within the internal combustion engine.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
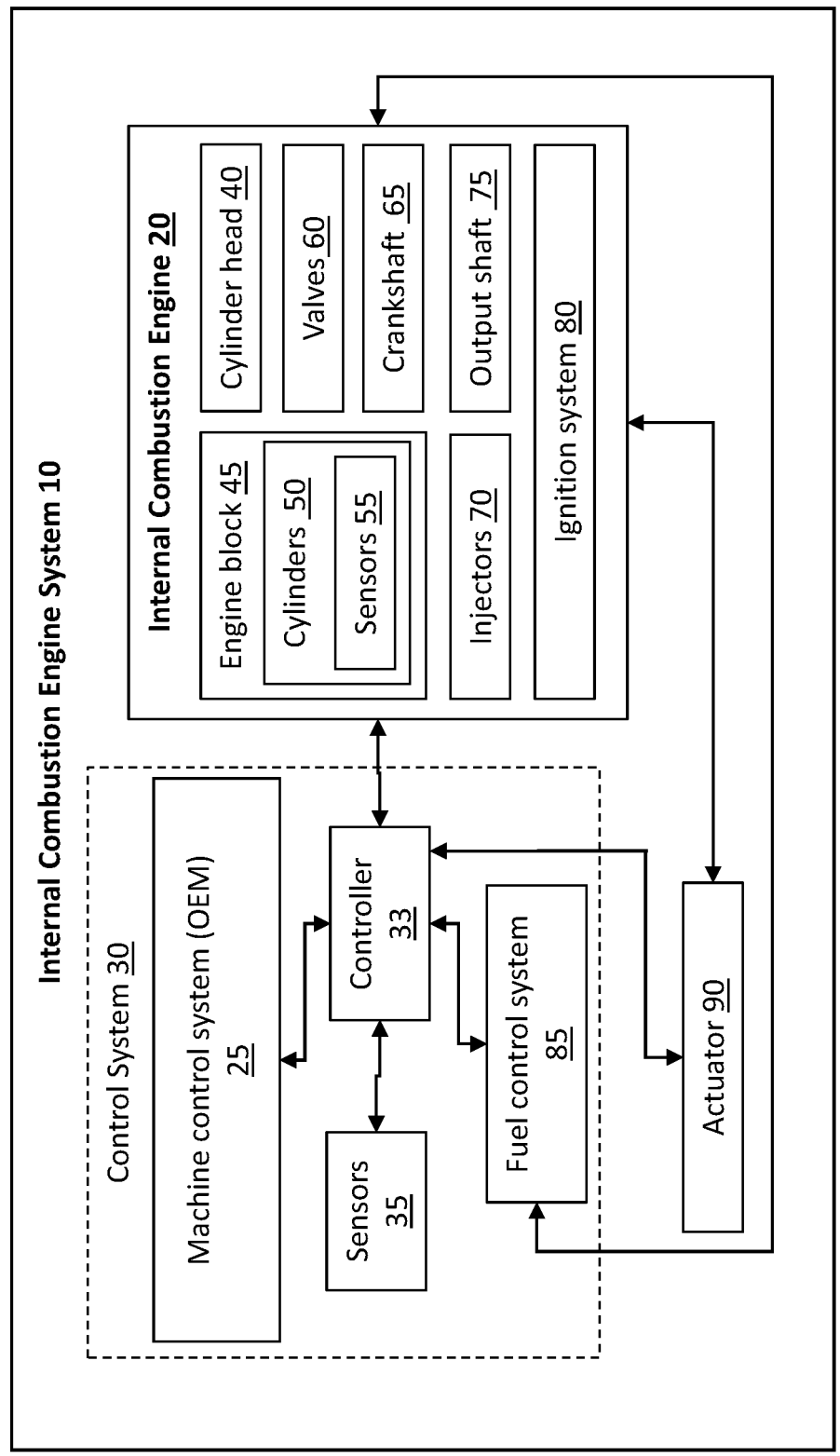
FIG. 1 is a block diagram of a dual fuel engine system, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are contemplated and made part of this disclosure.

The present disclosure pertains at least in part to systems and methods providing for determining and compensating for fuel injector drift within a dual fuel engine system.

Referring to FIG. 1, a block diagram of an internal combustion engine system 10 is shown, according to an exemplary embodiment. includes an internal combustion engine 20, which is operably coupled to a control system 30 with at least one controller 33. The control system 30, which includes a machine control system (OEM system) 25, is configured to send one or more inputs to the controller 33, where the controller 33 then controls the internal combustion engine 20.

In various embodiments, the controller 33 is configured to include a processor and a non-transitory computer readable medium (e.g., a memory device) having computer-readable instructions stored thereon that, when executed by the processor, cause the at least one controller 33 to carry out one or more operations. In various embodiments, the at least one controller 33 is a computing device (e.g., a microcomputer, microcontroller, or microprocessor). In other embodiments, the at least one controller 33 is configured as part of a data cloud computing system configured to receive commands from a user control device and/or remote computing device.

As shown in FIG. 1, the internal combustion engine system 10 includes the internal combustion engine 20, which is operably coupled to the control system 30 and at least one actuator 90. As shown, the internal combustion engine 20 is coupled to the control system 30 via the at least one controller 33. In various embodiments, the internal combustion engine system 10 can be configured for use with various fuel types, including, but not limited to, natural gas, petroleum products, ethanol, hydrogen, methanol, ammonia, etc. In various embodiments, the internal combustion engine 20 can be a spark ignition engine, a dual fuel engine, a micro-pilot ignited engine, or any other engine known in the art. In some embodiments, the internal combustion engine 20 is a hydrogen fueled spark ignition engine. In some embodiments, the internal combustion engine 20 is a spark ignited engine structured to operate using a low cetane number fuel (e.g., natural gas).

In embodiments where the internal combustion engine 20 is a dual fuel engine, the internal combustion engine 20 is structured to operate using a first fuel and a second fuel. In some embodiments, the first fuel has a low cetane number (e.g., natural gas) and the second fuel has a comparatively high cetane number (e.g., diesel). In some embodiments, the internal combustion engine system 10 is configured to be an engine having a dual fuel operation mode, the engine configured to operate using the first fuel and the second fuel.

In various embodiments, the first fuel and the second fuel have different properties and/or chemical compositions. The properties can include auto-ignition temperatures, flame speeds, etc. The fuels can include diesel and natural gas, for example. For example, the first fuel can be a diesel fuel. The second fuel can be, for example, natural gas, an e-fuel or liquid biofuel. The liquid biofuel can be methanol and/or ethanol, for example. The first fuel or the second fuel can be any one of a high cetane number fuel, such as diesel, gas-to-liquid (GTL) diesel, heavy fuel oil (HFO), low sulfur fuel oil (LFSO), hydrotreated vegetable oil (HVO), marine gas oil (MGO), renewable diesel, biodiesel, paraffinic diesel, dimethyl ether (DME), F-76 fuel, F-34 fuel, jet A fuel, JP-4 fuel, JP-8 fuel, or oxymethylene ether (OME), or a low cetane number fuel (e.g., a high octane number fuel, a high methane number fuel). The low cetane number fuel can be, for example, natural gas, hydrogen, ethane, propane, butane, syngas, ammonia, methanol, ethanol, or gasoline. The first fuel and/or the second fuel can optionally be a blend of fuels. It should be appreciated that the foregoing are merely examples of fuels, and other types of first and second fuels are not precluded. In various embodiments, the internal combustion engine system 10 is configured for one or more oil and gas production applications (e.g., land based oil and/or gas drilling and hydraulic fracturing).

As shown in FIG. 1, the controller 33 is operably coupled to a machine control (OEM) system 25, at least one sensor 35, at least one fuel control system 85, and at least one actuator 90. In other embodiments, the controller 33 can be coupled to fewer or more components. In some embodiments, the actuator 90 is operably coupled to the internal combustion engine 20. In various embodiments, the fuel control system 85 is operably coupled to the internal combustion engine 20. In some embodiments, the fuel control system 85 is configured to control or facilitate flow of fuel into the internal combustion engine 20. The actuator 90 can include one or more actuators that are structured to provide an input to the fuel control system 85 and/or actuators that are structured to respond to an output of the fuel control system 85. In various embodiments, the actuator 90 can include one or more fuel type actuators (e.g., gas pedal, diesel type actuator, etc.), air handling actuators, aftertreatment actuators, or any other type of actuator within the internal combustion engine system 10. Accordingly, during operation, the controller 33 can send and/or receive one or more inputs to one or more components within the internal combustion engine 20, the fuel control system 85, the at least one sensor 35, the OEM system 25, and the actuator 90.

As shown, the internal combustion engine 20 includes a cylinder head 40 and an engine block 45. As shown, the engine block 45 can include at least one cylinder 50 comprising at least one sensor 55. In various embodiments, the engine block 45 can include a plurality of cylinders 50, where each cylinder within at least a subset of the plurality of cylinders 50 includes at least one sensor 55. In various embodiments, each of the cylinders within the plurality of cylinders 50 includes at least one sensor 55. In other embodiments, only one cylinder within the subset of cylinders 50 includes at least one sensor 55. The at least one sensor 55 can be configured to sense one or more conditions associated with each corresponding cylinder 50. In various embodiments, the at least one sensor 55 can be a pressure sensor. For example, in various embodiments, the at least one sensor 55 is an in-cylinder pressure sensor (ICPS). In other embodiments, the at least one sensor 55 can be a temperature sensor, an ionization sensor, an optical sensor, or any other sensor type known in the art.

In various embodiments, the one or more sensors 35 within the control system 30 can be operably connected to the cylinders 50 and/or the sensors 55, where the one or more sensors 35 can be configured to sense one or more conditions of one or more corresponding cylinders 50. In various embodiments, the one or more sensors 35 are configured to sense the condition associated with the one or more cylinders 50 in addition to or instead of the one or more sensors 55. In various embodiments, the one or more sensors 35 can be a pressure sensor. In other embodiments, the one or more sensors can be a temperature sensor. In yet other embodiments, the one or more sensors 35 can be any other sensor type known in the art.

In various embodiments, the internal combustion engine 20 includes one or more valves 60, such as intake and exhaust valves, and a valvetrain configured to control operation of the valves 60. The one or more valves 60 are structured to allow or restrict flow of air, an air-fuel mixture, and/or exhaust between the cylinder head 40 and/or cylinders 50 during operation of the internal combustion engine 20. For example, an intake valve within the one or more valves 60 can control the flow of intake charge into the cylinders 50. Similarly, an exhaust valve within the one or more valves 60 can control a flow of combustion products exiting the cylinders 50. The internal combustion engine 20 also includes the at least one manifold, which is structured to facilitate flow of an air-fuel mixture into and out of the cylinders 50. For example, the at least one manifold can include at least one intake manifold having at least one passage for air or the air-fuel mixture to reach the cylinders 50. The least one manifold can also include at least one exhaust manifold having at least one passage for exhaust to flow from the cylinders 50 to an exhaust system. In various embodiments, the exhaust system can include an aftertreatment system, mufflers, a stack, and/or any other suitable components known in the art.

As shown, the internal combustion engine 20 also includes at least one fuel injector 70. The at least one fuel injector 70 is configured to add fuel (e.g., inject fuel) to the cylinders 50. In various embodiments, the at least one fuel injector 70 includes a port injector. In other embodiments, the at least one fuel injector 70 is structured to inject fuel directly into the cylinders 50. In some embodiments, the at least one fuel injector 70 includes a throttle body injector. In various embodiments, the at least one fuel injector 70 includes at least two fuel injectors. In some embodiments, the at least two fuel injectors includes at least one first fuel injector corresponds to the first fuel and at least one second fuel injector corresponds to the second fuel. In various embodiments, the at least one fuel injector 70 can be a fuel injector or fuel delivery valve. In other embodiments, the at least one fuel injector 70 includes a plurality of fuel injectors. In some embodiments, the each of the plurality of fuel injectors has a different operating parameter as compared to another of the plurality of fuel injectors. In various embodiments, the operating parameters of the plurality of fuel injectors can include, but are not limited to, a minimum pulse width, a maximum pulse width, a relaxation time, a fuel spray configuration, a fuel spray volume, fuel flow rate, a number of injection events per engine cycle, or a fuel pressure.

In addition, the internal combustion engine 20 can include an ignition system 80 coupled to or contained within the cylinder head 40. The ignition system 80 can facilitate ignition of charge (i.e., an ignitable mixture) supplied to the cylinders 50 and cause combustion therein. The ignition system 80 is structured to initiate combustion within the cylinders 50 by igniting the ignitable mixture (i.e., which has flowed through the engine block 45 and the cylinder head 40). Energy from the combustion of fuel supplied to the cylinders 50 can then drive an output shaft 75 within the internal combustion engine 20 to power the internal combustion engine system 10. The internal combustion engine 20 operates during one or more consecutive engine cycles. During the one or more consecutive engine cycles, a piston, which is coupled to at least one crankshaft 65, within the internal engine passes through multiple strokes (or intervals) within the engine cycle. In various embodiments, the crankshaft 65 is mounted within the engine block 45 and is structured to transform linear motion of the piston (coupled to the cylinders 50) into rotational motion (i.e., of the output shaft 75). In various embodiments, the at least one crankshaft 65 includes a plurality of crankshafts.

In various embodiments, the internal combustion engine 20 is a two-stroke engine, where each engine cycle therefore includes two intervals. In other embodiments, the internal combustion engine 20 is a four-stroke engine in which each engine cycle comprises four intervals. In embodiments, where the internal combustion engine 20 is a four-stroke engine, each engine cycle includes four intervals corresponding to four piston strokes: an intake interval, a compression interval, a power interval, and an exhaust interval. In other embodiments, the internal combustion engine 20 can be structured to operate using more than four strokes.

In various embodiments, the controller 33 is configured to receive at least one signal corresponding to a condition within at least one cylinder of the plurality of cylinders 50 within the internal combustion engine 20. In various embodiments, the at least one signal corresponds to a pressure within the at least one cylinder 50. The controller 33 can receive the signal from the one or more sensors 35 and/or the one or more sensors 55, which are configured to measure one or more parameters within the cylinder 50. In various embodiments, the internal combustion engine system 10 includes a same number of sensors 35 and/or sensors 55 as a number of cylinders 50. In such embodiments, each cylinder of the plurality of cylinders 50 corresponds to at least one sensor 35 and/or at least one sensor 55. In various embodiments, the controller 33 is configured to receive at least one signal from at least one cylinder 50 within the plurality of cylinders 50 following each fuel injection event. In some embodiments, the controller 33 is configured to receive at least one signal from at least one cylinder 50 within the plurality of cylinders during each engine cycle. In other embodiments, the controller 33 is configured to receive at least one combustion signal from at least one cylinder 50 within the plurality of cylinders 50 for each interval (i.e., stroke of the piston).

When the internal combustion engine system 10 is in operation, the fuel control system 85 facilitates flow of fuel into the internal combustion engine 20 in response to a fueling request received by the controller 33, which is caused by actuation of the at least one actuator 90 and/or as part of steady state conditions for the internal combustion engine 20. Upon receiving the request for fueling, the controller 33 can then send at least one fueling command to the at least one injector 70, which is then configured to inject fuel directly or indirectly (e.g., via a port injector) to the plurality of cylinders 50 to facilitate combustion of said fuel by the ignition system 80. In various embodiments, the control system 30 for the internal combustion engine 20 is structured to operate using at least one fuel. In some embodiments, the control system 30 comprises at least one sensor 35 configured to sense a condition within at least one cylinder 50 of the plurality of cylinders 50 within the internal combustion engine 20, and a controller 33 operably connected to the at least one sensor 35. In various embodiments, the controller 33 is configured to receive at least one fueling request corresponding to the at least one fuel.

The controller 33 can be further configured to send at least one fueling command to the at least one injector 70 within the internal combustion engine system 10 corresponding to the at least one fueling request. The controller 33 can be further configured to receive at least one signal from the at least one sensor 35 corresponding to the condition. Based on the at least one signal, the controller 33 can be configured to estimate an actual fueling amount within the internal combustion engine 20. The controller 33 can be configured to determine at least one compensation amount corresponding to the at least one injector 70 based on the actual fueling amount. In various embodiments, the actual fueling amount corresponds to energy density of fuel within the internal combustion engine 20. The actual fueling amount can correspond to a total fuel energy within the internal combustion engine 20. The energy density of fuel within the internal combustion engine 20 can be a lower heating value (LHV).

For example, in embodiments where the internal combustion engine 20 is a dual fuel engine operating using the first fuel and the second fuel, a first energy density of the first fuel may be greater than or less than a second energy density of the second fuel. That is, in a case where the first fuel and the second fuel have different energy densities, a same amount of each fuel (e.g., 1 mg) will produce different amounts of energy. Accordingly, as referenced herein, fueling amount refers to a fuel energy amount corresponding to the first fuel and the second fuel. In embodiments where the internal combustion engine 20 is a single fuel engine or is a dual fuel engine operating in a single fuel mode, the internal combustion engine 20 can operate using one of the first fuel or the second fuel and the actual fueling amount corresponds to the fuel energy amount of the corresponding first fuel or second fuel.

In other embodiments, the internal combustion engine system 10 comprises an internal combustion engine 20, where the internal combustion engine 20 includes a plurality of cylinders 50, at least one injector 70 configured to inject fuel into at least one cylinder 50 of the plurality of cylinders, and at least one sensor 35 in communication with each of the plurality of cylinders 50. In some embodiments, the internal combustion engine system 10 also includes the control system 30 configured to control the internal combustion engine 20, where the control system comprises at least one controller 33. In various embodiments, the at least one controller 35 is configured to send at least one fueling command to the at least one injector 70 responsive to receiving at least one fueling request. The at least one controller 33 can be further configured to receive at least one pressure from the at least one sensor 35, where the at least one pressure corresponds to an internal pressure within at least one cylinder 50 of the plurality of cylinders 50. The at least one controller 33 can be further configured to estimate, based on the at least one pressure, an actual fueling amount within the internal combustion engine 20. The at least one controller 33 can be configured to determine at least one compensation amount corresponding to the at least one fueling command.

As described above, performance of the at least one injector 70 can decline with time and/or repeated use. Specifically, the at least one injector 70 can drift in that the amount of fuel injected by the at least one injector 70 varies from the amount fuel corresponding to the fueling command received by the controller 33. Variations in the injected fuel amount can lead to miscalculations of the fuel substitution rate, among other parameters, by the controller 33, which can cause damage to the internal combustion engine 20 and/or cause poor performance. Accordingly, the controller 33 can be configured to carry out one or more operations to determine an amount of drift corresponding to the at least one injector 70 and adjust one or more fueling commands sent to the at least one injector 70 to compensate for the drift amount (i.e., compensation amount).

Figure 2:
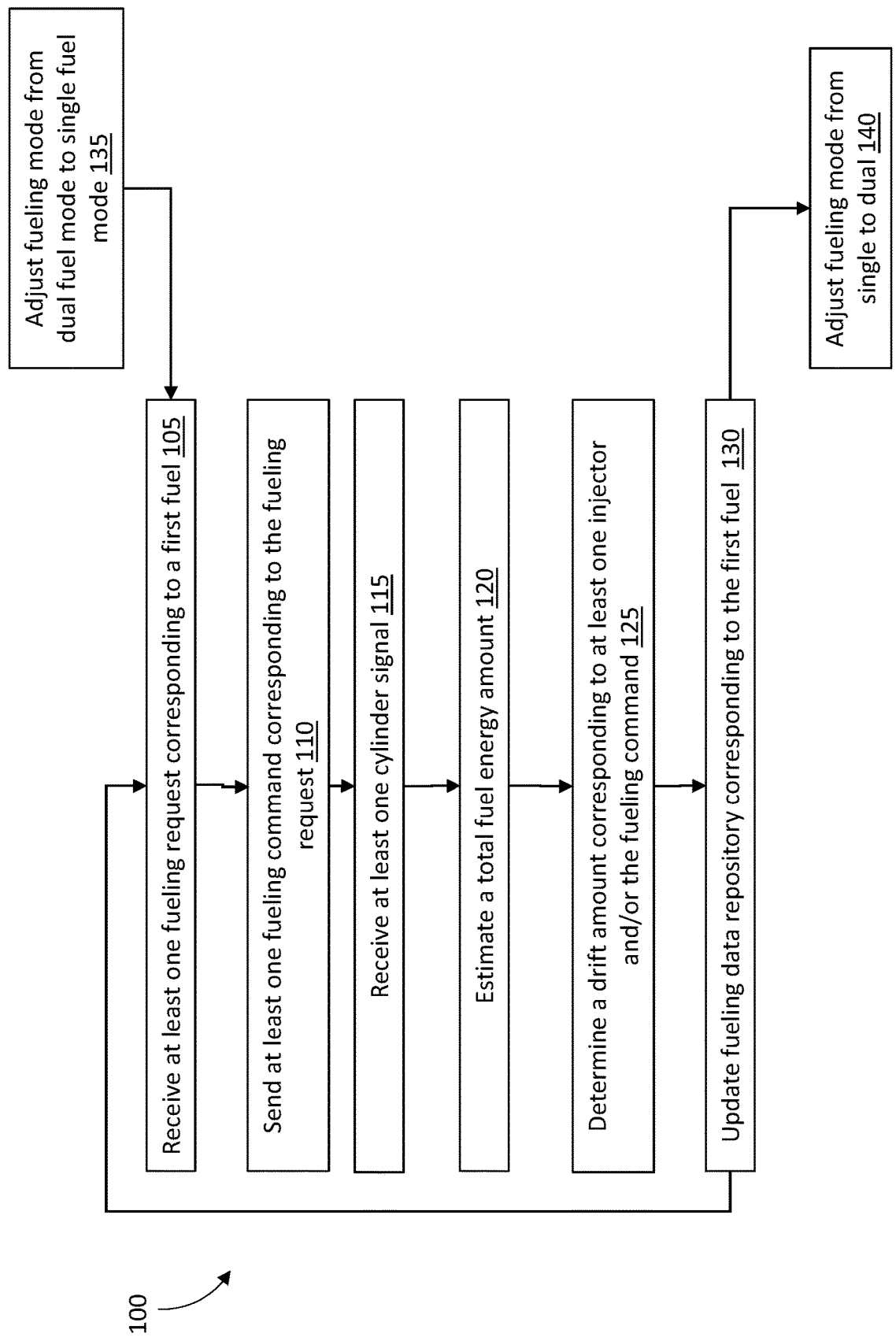
FIG. 2 is a flow diagram illustrating an example method of operating the engine system of FIG. 1.

FIG. 2 illustrates a method 100 carried out by the controller 33 to compensate for drift of the at least one injector. In an operation 105, the controller 33 can receive at least one fueling request corresponding to a first fuel within the internal combustion engine 20. In various embodiments, the fueling request can be caused by the actuator 90. In other embodiments, the fueling request can be sent by the OEM 25 to maintain a steady state operation of the internal combustion engine 20. Upon receiving the fueling request, the controller 33 can send at least one corresponding fueling command to the at least one injector 70 in an operation 110. After sending the at least one fueling command, the controller 33 can receive at least one signal from at least one cylinder 50 of the plurality of cylinders 50 in an operation 115. The at least one signal can correspond to at least one condition sensed by the one or more sensors 35 and/or 55. In various embodiments, the at least one signal is an internal pressure within the at least one cylinder 50. Accordingly, in an example operation 115, the controller 33 can receive an internal pressure (i.e., as sensed by the one or more sensors 35 and/or 55) corresponding to at least one cylinder 50 of the plurality of cylinders 50.

In an operation 120, the controller 33 can estimate a total fuel energy amount or a actual fuel rate resulting from the at least one fueling command. In various embodiments, the controller 33 is configured to calculate the actual fuel rate from the internal cylinder pressure (ICPS). For example, in some embodiments, the controller 33 is configured to calculate an apparent cumulative heat release amount within the internal combustion engine based on the ICPS. Once the controller 33 has determined the apparent cumulative heat release amount, the controller 33 can determine the actual fuel rate by correlating it to the apparent cumulative heat release amount. In some instances, this correlation can be generated using test cell data collected during development of the internal combustion engine system 10 and prior to operation thereof.

In other embodiments, the controller 33 can be configured to determine the gross indicated mean effective pressure (IMEP) and correlating the determined IMEP to an actual fuel rate (e.g., from test cell data). For example, in various embodiments, the controller 33 is configured to receive ICPS as measured by at least one sensor 35 and/or 55 over the duration of a piston stroke or engine cycle. Accordingly, the controller 33 can then determine ICPS versus an air displacement volume of the piston and calculate the IMEP therefrom. Using the calculated IMEP, the controller 33 can then determine an actual fuel rate corresponding to the calculated IMEP value, such as from test cell data acquired during development of the internal combustion engine system 10.

In yet other embodiments, the controller 33 can determine the actual fuel rate by correlating it to a determined pressure ratio. For example, in some embodiments, the controller 33 can be configured to receive ICPS as measured by at least one sensor 35 and/or 55 during multiple piston strokes and/or multiple engine cycles, where the crank shaft 65 is at varying corresponding crank angles. Accordingly, the controller 33 can determine a pressure ratio associated with at least one cylinder 50 using a first pressure measured for the at least one cylinder 50 at a first interval and a second pressure measured for the at least one cylinder 50 at a second interval. For example, the controller 33 can determine a pressure ratio associated with the at least one cylinder 50 using a first pressure corresponding to an ICPS measured when the crankshaft 65 is at a first crank angle and a second pressure corresponding to an ICPS measured when the crankshaft 65 is at a second crank angle. In various embodiments, the first crank angle is 60 degrees and the second crank angle is −60 degrees. Once the controller 33 determines the pressure ratio, the controller can then determine an actual fuel rate corresponding to said pressure ratio, such as from test cell data acquired during development of the internal combustion engine system 10.

In various embodiments, the controller 33 can determine whether to calculate the actual fueling rate based on the ICPS, the IMEP, or a pressure ratio. In some embodiments, the controller 33 can determine to calculate the actual fueling rate based on the ICPS if the controller 33 determines that the ICPS satisfies an accuracy threshold, such as, for example, based on amount of noise present in the signal. In other embodiments, the controller 33 can determine to calculate the actual fueling rate based on the IMEP value based on capabilities of the control system 30. For example, if the control system 30 is incapable of carrying out analyses related to heat release, the controller 33 can be configured to determine the actual fueling rate using a ratio of pressures. In various embodiments, the controller 33 is configured to carry out calculations to determine the actual fueling rate. In other embodiments, the controller 33 is configured to retrieve calculated values from one or more cloud computing systems in communication with the controller 33.

Once the controller has determined the total fuel energy amount or actual fuel rate in the operation 120, the controller 33 can calculate an actual fuel injection amount of the first fuel by the at least one injector 70 and, consequently, determine a drift amount or compensation amount for the at least one injector 70. For example, if the at least one fuel command in the operation 110 was for an injection of approximately 60 mg/engine stroke, and the controller 33 determines in the operation 125 that the actual fuel injection amount was 30 mg/engine stroke, the controller 33 can calculate an injection amount-specific drift amount (i.e., compensation amount) of −30 mg/engine stroke for the at least one injector 70. Upon determining the injection-specific drift amount (i.e., compensation amount) for the at least one injector 70, the controller 33 can update at least one first fueling data repository corresponding to the first fuel. In various embodiments, the at least one first fueling data repository can be a database or look-up table stored in a memory within the control system 30. In other embodiments, the at least one first fueling data repository can be a database or look-up table stored in a memory within a computing device that is separate from but in communication with the internal combustion engine system 10. In yet other embodiments, the first fueling data repository can be a database or look-up table stored within a cloud or other remote storage computing device.

In various embodiments, the controller 33 is configured to carry out the method 100 each time the controller 33 receives at least one fueling request such that the first fueling data repository is updated after each fuel injection. In various embodiments, the controller 33 is also configured to store engine operation parameters corresponding to each fueling request within the first fueling data repository such that each injection amount-specific drift amount (i.e., compensation amount) is also correlated to one or more operating parameters of the internal combustion engine 20. In various embodiments, the at least one operating condition or operating parameter of the internal combustion engine 20 can include, but is not limited to, engine speed (e.g., rpm), a commanded fuel rate, injection timing, a desired substitution rate, a temperature of coolant within the engine 20, a temperature of oil within the engine 20, etc.

In various embodiments, the controller 33 is configured to carry out the method 100 periodically as part of a preprogramed maintenance routine. In embodiments where the internal combustion engine system 10 is a dual fuel engine system and thus the internal combustion engine 20 is a dual fuel engine, the controller 33 can be configured to adjust a fueling mode of the internal combustion engine 20 from a dual fuel mode to a single fuel mode in an operation 135 prior to initiating the operation 105. Similarly, after carrying out the operation 130 or after repeating the method 100 a predetermined number of times, the controller 33 can be configured to adjust the fueling mode of the internal combustion engine 20 from the single fuel mode back to the dual fuel mode in an operation 140.

Figure 3:
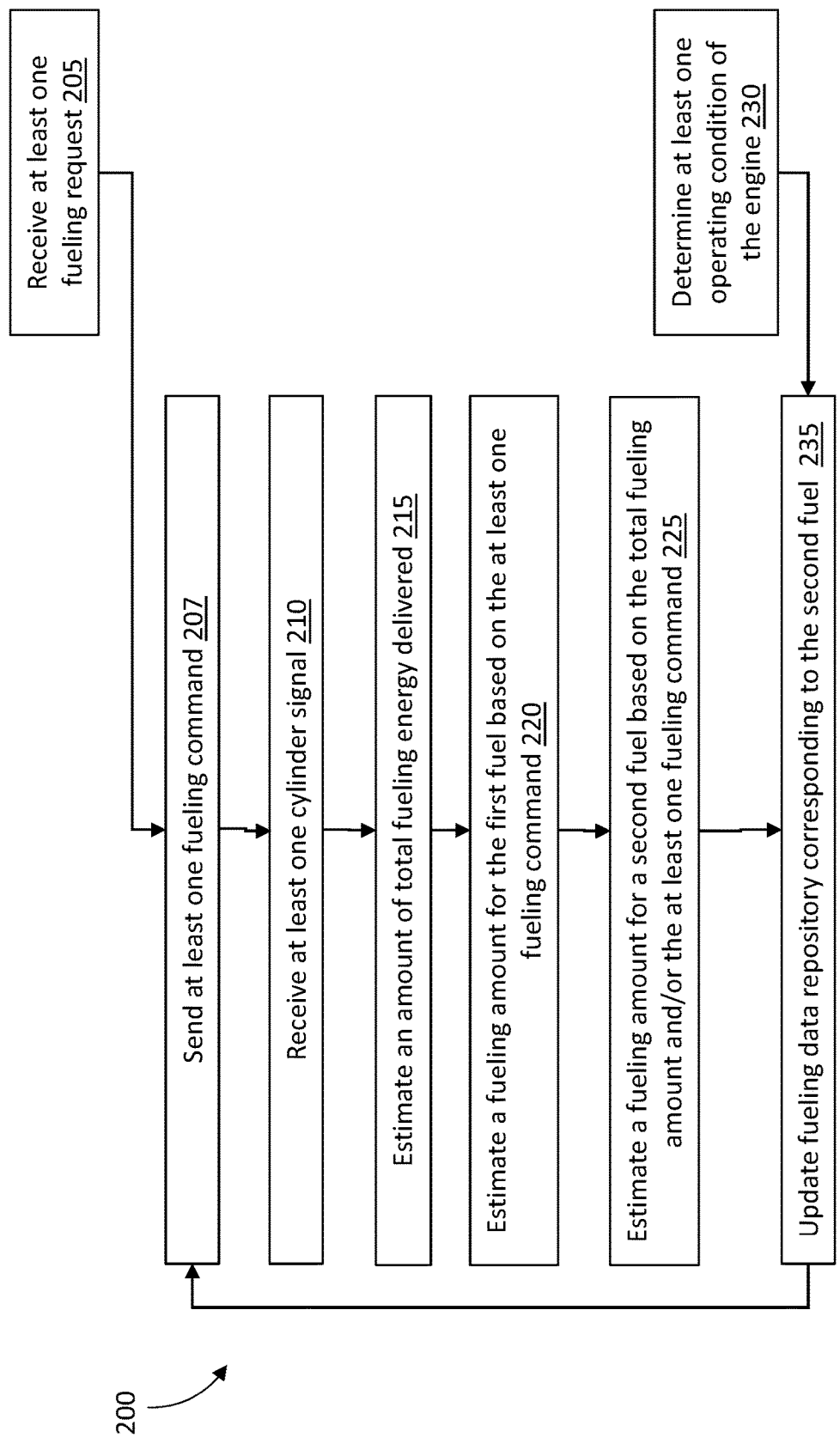
FIG. 3 is a flow diagram illustrating another example method of operating the engine system of FIG. 1.

In embodiments where the internal combustion engine 20 is a dual fuel engine, the controller 33 can be configured to use the drift amounts (i.e., compensation amounts) for a first fuel as determined in the method 100 to determine drift amounts (i.e., compensation amounts) for a second fuel in a method 200. Accordingly, embodiments relating to the methods illustrated in FIGS. 3 and 4 reference the internal combustion engine system 10 being a dual fuel engine system including the internal combustion engine 20, which is configured to operate using a first fuel and a second fuel. FIG. 3 is a flow diagram illustrating the method 200, in which the controller 33 is configured to use injection drift amounts (i.e., compensation amounts) for a first fuel to determine one or more injection drift amounts (i.e., compensation amounts) for a second fuel. In other embodiments, the controller 33 is configured to implement the method 200 to determine fueling amounts corresponding to each of the first fuel and the second fuel.

As shown, the controller 33 can be configured to, in the operation 207, send at least one fueling command to at least one injector 70 to provide an amount of at least one of the first fuel or the second fuel to at least one cylinder 50 of the plurality of cylinders 50. In various embodiments, the at least one injector 70 includes at least one first injector 70 and at least one second injector 70. In some embodiments, the at least one first injector 70 is configured to inject an amount of the first fuel and the at least one second injector 70 is configured to inject an amount of the second fuel. Accordingly, in some embodiments, the at least one fueling command can include at least one first fuel command to the at least one first injector 70 and at least one second fuel command to the at least one second injector 70. In some embodiments, the controller 33 can be optionally configured to carry out the operation 207 responsive to receiving at least one fueling request in an operation 205.

In the operation 210, the controller 33 is configured to receive at least one signal from at least one cylinder 50 of the plurality of cylinders 50. As described above, the at least one signal can be the ICPS—the internal pressure within the at least one cylinder. The controller 33 can then determine the total fueling energy delivered or the actual fueling rate in the operation 215. In various embodiments, the operations 210 and 215 are respectively equivalent to the operations 115 and 120 of the method 100.

Using the determined actual fueling rate determined in the operation 215, the controller 33 can estimate a first fueling amount of the first fuel using the first fuel command and known injection drift determined from the first fueling data repository in the operation 220. Once the controller 33 has estimated the first fueling amount of the first fuel, the controller 33 can then estimate a second fueling amount of the second fuel based on the estimated first fueling amount of the first fuel. In other embodiments, the controller 33 can estimate the second fueling amount of the second fuel based on the actual fueling rate in the operation 225. In yet other embodiments, the controller 33 can be configured to estimate the second fueling amount of the second fuel based on the actual fueling rate and the estimated first fueling amount of the first fuel. For example, the controller 33 can subtract the estimated fueling amount of the first fuel from the actual fueling rate (i.e., the total fueling amount) to determine an estimated fueling amount of the second fuel.

Once the controller 33 has determined the estimated fueling amount of the second fuel corresponding to the at least one second fuel command (i.e., in the operation 225) the controller 33 can be configured to determine a drift amount (i.e., compensation amount) for the at least one second injector 70. The controller 33 can then subsequently update at least one second fueling data repository corresponding to the second fuel. In various embodiments, the at least one second fueling data repository can be a database or look-up table stored in a memory within the control system 30. In other embodiments, the at least one second fueling data repository can be a database or look-up table stored in a memory within a computing device that is separate from but in communication with the internal combustion engine system 10. In yet other embodiments, the second fueling data repository can be a database or look-up table stored within a cloud or other remote storage computing device.

In some embodiments, the controller 33 is optionally configured to, in an operation 230, determine at least one operating condition or operating parameter of the internal combustion engine 20 corresponding to the at least one fueling request received in the operation 205 and the at least one fueling command sent in the operation 207. In various embodiments, the at least one operating condition or operating parameter of the internal combustion engine 20 can include, but is not limited to, engine speed (e.g., rpm), a commanded fuel rate, injection timing, a desired substitution rate, a temperature of coolant within the engine 20, a temperature of oil within the engine 20, etc. Accordingly, in some embodiments, once the controller 33 has determined the estimated fueling amount of the second fuel corresponding to the at least one second fuel command (i.e., in the operation 225) and determined at least one operating condition or parameter of the internal combustion engine 20 (i.e., in the operation 230), the controller 33 can be configured to determine a drift amount (i.e., compensation amount) for the at least one second injector 70.

In various embodiments, the internal combustion engine system 10 includes the internal combustion engine 20, a plurality of cylinders 50, at least one injector 70 configured to inject a first fuel and a second fuel into at least one cylinder 50 of the plurality of cylinders 50, and the control system 30 configured to control the internal combustion engine 10. In various embodiments, the control system 30 comprises at least one controller 30 configured to: send at least one fueling command to the at least one injector 70, estimate an actual fueling amount within the internal combustion engine 20 based on a signal received from the at least one cylinder 50 of the plurality of cylinders, estimate a fueling amount for the first fuel based on the actual fueling amount, and estimate a fueling amount for the second fuel based on at least one of the actual fueling amount or the fueling amount for the first fuel.

In some embodiments, the internal combustion engine system 10 includes the internal combustion engine 20 having a plurality of cylinders 50, a first injector 70 configured to inject a first fuel, a second injector 70 configured to inject a second fuel into at least one cylinder 50 of the plurality of cylinders 50, and the control system 30 configured to control the internal combustion engine 20. The control system 30 includes at least one controller 33. The at least one controller 33 is configured to send at least one fueling command to at least one of the first injector or the second injector. The at least one controller 33 is configured to estimate an actual fueling amount within the internal combustion engine 20 based on a signal received from the at least one cylinder 50 of the plurality of cylinders 50. The at least one controller 33 is configured to estimate a fueling amount for the first fuel based on the actual fueling amount. The at least one controller 33 is configured to estimate a fueling amount for the second fuel based on at least one of the actual fueling amount or the fueling amount for the first fuel.

In various embodiments, the control system 30 for the internal combustion engine 20, where the internal combustion engine 20 is structured to receive at least a first fuel, includes the at least one sensor 55 and the controller 33. The at least one sensor 55 is configured to sense a condition within at least one cylinder 50 within the internal combustion engine 20. The controller 33 is operably connected to the at least one sensor 55. The controller 33 is configured to receive at least one fueling request corresponding to at least the first fuel. The controller 33 is configured to send at least one fueling command to at least one injector 70 within the internal combustion engine 20 corresponding to the at least one fueling request. The controller 33 is configured to receive at least one signal from the at least one sensor 55 corresponding to the condition. The controller 33 is configured to, based on the at least one signal, estimate an actual fueling amount within the internal combustion engine 20. The controller 33 is further configured to determine at least one compensation amount corresponding to the at least one injector 70 based on the actual fueling amount.

In various embodiments, the controller 33 is configured to carry out the method 200 periodically as part of a preprogramed maintenance routine. In various embodiments, the method 200 is carried out each time the controller 33 receives a fueling request corresponding to the first fuel and the second fuel. In various embodiments, the controller 33 is configured to sequentially carry out the methods 100 and 200 to determine compensated fueling amounts for a first fuel and/or second fuel within the internal combustion engine system 10. In some embodiments, the controller 33 is configured to carry out the methods 100 and/or 200 (i.e., in series) in response to the controller 33 receiving at least one fueling request for at least one of the first fuel or the second fuel. In other embodiments, the controller 33 is configured to carry out the methods 100 and 200 during periods of predetermined maintenance of the internal combustion engine system 10. In yet other embodiments, the controller 33 can be configured to periodically carry out the methods 100 and 200 after a predetermined number of engine or engine cycles, or after a predetermined number of operation hours of the internal combustion engine 20.

Figure 4:
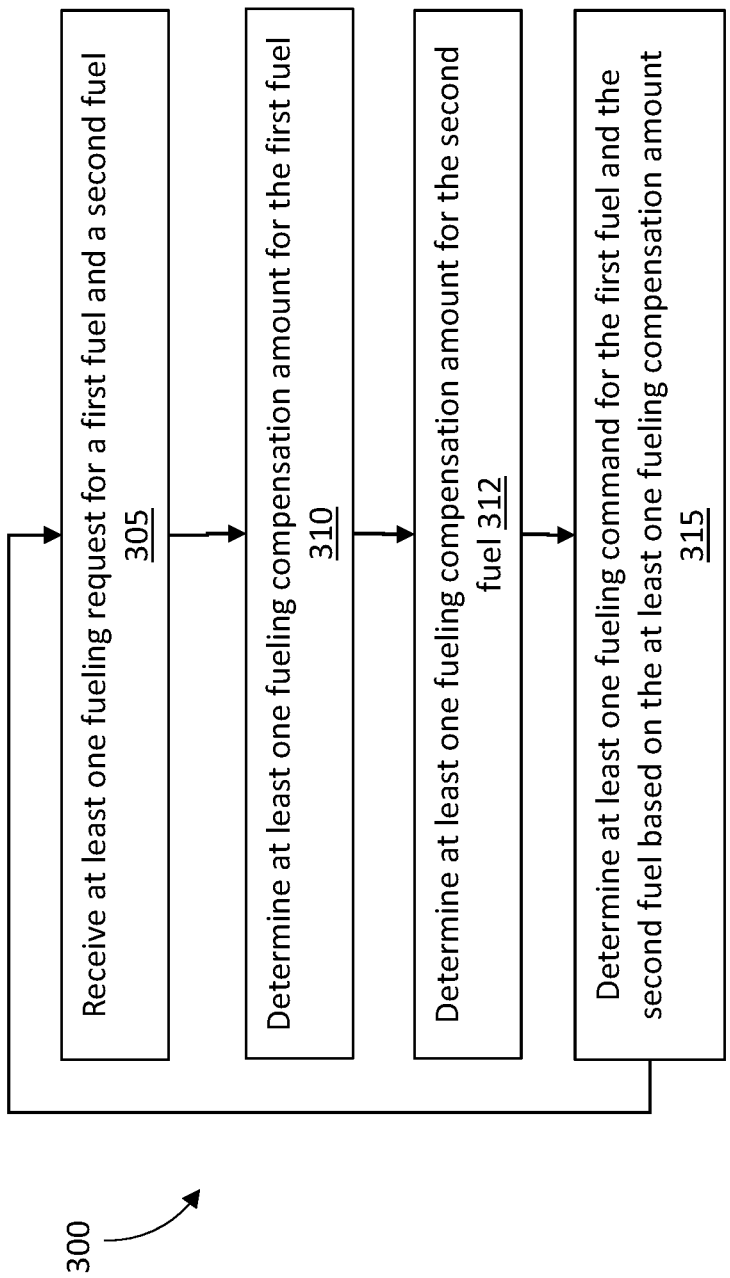
FIG. 4 is a flow diagram illustrating another example method of operating the engine system of FIG. 1.

During operation of the internal combustion engine system 10, the controller can be configured to carry out the methods 100 and 200 by implementing a method 300, as illustrated in FIG. 4. As shown, the controller 33 can receive at least one fueling request for a first fuel and a second fuel in the operation 305. The controller 33 can then determine a compensation amount for the first fuel in an operation 310. Although the methods 100, 200, and/or 300 are described herein in reference to compensating an amount for the first fuel, it should be appreciated that in various embodiments, the controller 33 can be configured to additionally or alternatively carry out the operations of methods 100, 200, and/or 300 to compensate an amount for the second fuel or for both the second fuel and the first fuel. For example, in various embodiments, the at least one fueling request includes a first fueling request corresponding to the first fuel and a second fueling request corresponding to the second fuel. Accordingly, in some implementations of the operation 310, the controller 33 can be configured to reference the first fueling data repository and determine the compensation amount for the first fuel based on the first fueling request and one or more operating conditions and/or parameters of the internal combustion engine 20. In other implementations of the operation 310, the controller 33 is configured to carry out the method 100, including the operations 135 and 140, to determine the compensation amount for the first fuel.

In other embodiments, the controller 33 can be configured to determine a compensation amount based on a predicted drift amount. The predicted drift amount can be an error percentage, an amount of fuel, or any other suitable parameter known in the art. In some embodiments, the predicted drift amount can be provided by the manufacturer. In other embodiments, the predicted drift amount can be experimentally determined. In yet other embodiments, the predicted drift amount can be set based on one or more performance metrics of the internal combustion engine 20. After determining the predicted drift amount, the controller 33 can compensate the fueling amount for the first fuel (or the second fuel, or the first fuel and the second fuel) based on the predicted drift amount. For example, in a case where the predicted drift amount is an error percentage of 1% per 1000 hours of operation (i.e., of the at least one injector 70) for the first fuel, the controller 33 can be configured to compensate the fueling amount for the first fuel based on the error percentage and the length of operation.

After determining the compensation amount for the first fuel, the controller 33 can be configured to determine a compensation amount for the second fuel in the operation 312. In some implementations of the operation 312, the controller 33 can be configured to reference the second fueling data repository and determine the compensation amount for the second fuel based on the second fueling request and one or more operating conditions and/or parameters of the internal combustion engine 20. In other implementations of the operation 312, the controller 33 is configured to carry out the method 100 and the method 200 (or just the method 200), to determine the compensation amount for the second fuel.

In implementations where the controller 33 is configured to determine the compensation amounts for the first fuel and the second fuel by referencing the respective first fueling data repository and the second fueling data repository, the controller 33 can be configured to carry out the operations 310 and 312 simultaneously. After determining the compensation amounts for the first fuel and the second fuel, the controller 33 can, in the operation 315, be configured to then determine a first compensated fueling command for the first fuel and a second compensated fueling command for the second fuel using the respective compensation amounts for the first fuel and the second fuel. In various embodiments, the method 300 can be repeated for each fueling request received by the controller 33. In other embodiments, the method 300 can be repeated periodically after a predetermined number of engine cycles, a predetermined time interval, and/or after a predetermined number of hours of operation of the internal combustion engine 20. For example, in some embodiments, the method 300 can be repeated every 2 weeks. In other embodiments, the controller 33 can carry out the method 300 during predetermined maintenance modes (e.g., oil changes, installation or replacement of the at least one injector 70).

In various embodiments, the controller 33 can be configured to determine at least one of the compensation amounts for the first fuel or the second fuel by interpolating data within the first fueling data repository and/or the second fueling data repository. In some embodiments, the controller 33 can be configured to control the internal combustion engine system 10 to operate at a predetermined condition corresponding to known engine parameters and known fueling rates of the first fuel and/or the second fuel to determine compensation amounts for the first fuel and/or the second fuel corresponding to the predetermined condition. In various embodiments, the frequency at which the controller 33 carries out the methods 100, 200, and/or 300 can be based on an age of the at least one injector 70. For example, the controller 33 can increase a frequency at which it carries out the methods 100, 200, and/or 300 with increased hours of operation of the at least one injector 70.

In some embodiments, the controller 33 can be configured to determine a first fueling data repository (i.e., corresponding to the first fuel) and/or a second fueling data repository (i.e., corresponding to the second fuel) for each cylinder 50 of the plurality of cylinders. In other embodiments, the controller 33 can be configured to determine a first fueling data repository (i.e., corresponding to the first fuel) and/or a second fueling data repository (i.e., corresponding to the second fuel) for each bank of cylinders 50 within the internal combustion engine 20. For example, in embodiments where the internal combustion engine 20 includes two banks, such as a right bank and a left bank, the controller 33 is configured to determine a first fueling data repository (i.e., corresponding to the first fuel) and/or a second fueling data repository (i.e., corresponding to the second fuel) for each of the right bank and the left bank. In yet other embodiments, the controller 33 can be configured to determine a first fueling data repository (i.e., corresponding to the first fuel) and/or a second fueling data repository (i.e., corresponding to the second fuel) for each quadrant within the internal engine 20.

In some embodiments, when the controller 33 is carrying out the method 300, the controller 33 will only carry out the methods 100 and 200 if the controller 33 determines an error in compensation amounts (e.g., as determined in the operations 310 and/or 312) exceeds a predetermined threshold. For example, if the controller 33 carries out the operations 310 and 312 to determine the compensation amounts for the first fuel and the second fuel by referencing the first fueling data repository and the second fueling data repository, and subsequently determines that the corresponding first fueling command and second fueling command (corresponding to the first fuel and the second fuel, respectively) result in an actual fueling rate (i.e., a total fueling amount) that is offset from the desired fueling rate by the predetermined threshold, the controller 33 can repeat the method 300 and instead carry out the methods 100 and 200. In yet other embodiments, the controller 33 can calculate the actual fuel rate of the internal combustion engine 20 after each fueling request (i.e., based on the ICPS of at least one cylinder 50 of the plurality of cylinders 50) compare the actual fuel rate to a desired fuel rate. In various embodiments, comparing the actual fuel rate to the desired fuel rate includes determining a difference therebetween. The controller 33 can then, based on the comparison of the actual fuel rate to the desired fuel rate, determine whether to carry out one or more of the methods 100, 200, or 300. In some embodiments, the controller 33 is configured to set an error or fault code in response to determining the difference between the actual fuel rate and the desired fuel rate satisfies or exceeds a predetermined threshold.

In yet other embodiments, the controller 33 can be configured to selectively carry out part or all of the operations of the methods 100, 200, or 300. For example, in various implementations, a method of controlling the internal combustion engine 20 includes receiving, by at least one controller 33, at least one fueling request. In various embodiments, the at least one fueling request comprises a first fueling request and a second fueling request. In some embodiments, the first fueling request corresponds to a first fuel and the second fueling request corresponds to a second fuel. The method can further include determining, by the at least one controller 33, a first fueling compensation amount for the first fuel. The method can also include determining, by the at least one controller 33, a second fueling compensation amount for the second fuel. The method can further include determining, by the at least one controller 33, a first fueling command corresponding to the first fuel based on the first fueling compensation amount and a second fueling command corresponding to the second fuel based on the second fueling compensation amount. In some embodiments, each of the first fueling compensation amount and the second compensation amount is based on at least one pressure within at least one cylinder 50 of a plurality of cylinders 50 within the internal combustion engine.

In some embodiments, the internal combustion engine system 10 is in communication with one or more remote or cloud computing systems. In these embodiments, the one or more cloud computing systems can be configured to continuously monitor operation of the internal combustion engine system 10. For example, the one or more cloud computing systems can be configured to monitor operation of the internal combustion engine system 10 by monitoring at least one of a comparison of the actual fueling rate to a commanded/requested fueling rate, operating conditions or parameters of the internal combustion engine 20, hours of operation of the at least one injector 70 or the internal combustion engine 20, a number of cycles of the internal combustion engine 20, or any other parameter relevant to the internal combustion engine system 10. In some embodiments, the one or more cloud computing systems can be configured to determine trends in the operation of the internal combustion engine system 10. Accordingly, in some embodiments, the one or more cloud computing systems can be configured to send an alert or other signal to the controller 33 responsive to one or more performance predictions based on the trends in the operation of the internal combustion engine system 10. For example, if the one or more cloud computing systems predict failure (e.g., corresponding to an engine cycle number or engine operation parameter), the one or more cloud computing systems can send an alert to the controller 33 to initiate one or more mitigation operations. In some embodiments, the one or more mitigation operations can include engine shutdown. In other embodiments, the one or more mitigation operations can include producing a notification for a user of the internal combustion engine system 10 to initiate maintenance or other service. In yet other embodiments, the one or more mitigation operations can include lowering a power of the internal combustion engine 20 and/or switching from dual fuel mode to a single fuel mode.

Notwithstanding the embodiments described above in reference to FIGS. 1-4, various modifications and inclusions to those embodiments are contemplated and considered within the scope of the present disclosure.

The present technology may also include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A control system for an internal combustion engine, the internal combustion engine being structured to receive at least a first fuel, the control system comprising:
  at least one sensor configured to sense a condition within at least one cylinder within the internal combustion engine; and
  a controller operably connected to the at least one sensor, the controller configured to:
    receive at least one fueling request corresponding to at least the first fuel;
    send at least one fueling command to at least one injector within the internal combustion engine corresponding to the at least one fueling request;
    receive at least one signal from the at least one sensor corresponding to the condition;
    based on the at least one signal, estimate an actual fueling amount within the internal combustion engine; and
    determine at least one compensation amount corresponding to the at least one injector based on the actual fueling amount.

B. The control system of paragraph A, wherein the internal combustion engine is a dual fuel engine configured to receive the first fuel and a second fuel differing from the first fuel.

C. The control system of paragraph A, wherein the at least one signal indicates an internal pressure within the at least one cylinder.

D. The control system of paragraph A, wherein the at least one signal indicates a gross indicated mean effective pressure.

E. The control system of paragraph A, wherein the at least one signal includes a ratio of first pressure and a second pressure, the first pressure corresponding to an internal pressure within the at least one cylinder at a first crank angle and the second pressure corresponding to an internal pressure within the at least one cylinder at a second crank angle.

F. The control system of paragraph A, wherein the controller is configured to estimate the actual fueling amount based on test data corresponding to the internal combustion engine.

G. The control system of paragraph A, wherein the controller is further configured to update at least one fueling data repository with the at least one compensation amount.

H. The control system of paragraph G, wherein the at least one fueling data repository is part of a cloud computing system.

I. The control system of paragraph B, wherein the at least one compensation amount comprises a first amount and a second amount, the first amount corresponding to the first fuel and the second amount corresponding to the second fuel.

J. The control system of paragraph I, wherein the controller is further configured to adjust a mode of the internal combustion engine from a dual fuel mode to a single fuel mode prior to receiving the at least one fueling request.

K. The control system of paragraph I, wherein the controller is configured to adjust the mode of the internal combustion engine from the single fuel mode to the dual fuel mode after determining the at least one compensation amount.

L. An internal combustion engine system, the internal combustion engine system comprising:
  an internal combustion engine comprising:
    a plurality of cylinders;
    a first injector configured to inject a first fuel and a second injector configured to inject a second fuel into at least one cylinder of the plurality of cylinders; and
    a control system configured to control the internal combustion engine, the control system comprising at least one controller configured to:
      send at least one fueling command to at least one of the first injector or the second injector;
      estimate an actual fueling amount within the internal combustion engine based on a signal received from the at least one cylinder of the plurality of cylinders;
      estimate a fueling amount for the first fuel based on the actual fueling amount; and
      estimate a fueling amount for the second fuel based on at least one of the actual fueling amount or the fueling amount for the first fuel.

M. The internal combustion engine of paragraph L, wherein the at least one controller is configured to estimate the actual fueling amount by calculating at least one of a cumulative apparent heat release amount, a gross indicated mean effective pressure, or a pressure ratio based on the signal from the at least one cylinder.

N. The internal combustion engine of paragraph L, wherein the at least one controller is further configured to update at least one look-up table with the fueling amount for the second fuel.

O. The internal combustion engine of paragraph M, wherein the signal indicates an internal pressure within the at least one cylinder of the plurality of cylinders, and wherein the controller is configured to calculate the gross indicated mean effective pressure within the internal combustion engine.

P. A method of controlling an internal combustion engine, the method comprising:
receiving, by at least one controller, at least one fueling request;
wherein the at least one fueling request comprises a first fueling request and a second fueling request, the first fueling request corresponding to a first fuel and the second fueling request corresponding to a second fuel;
determining, by the at least one controller, a first fueling compensation amount for the first fuel;
determining, by the at least one controller, a second fueling compensation amount for the second fuel; and
determining, by the at least one controller, a first fueling command corresponding to the first fuel based on the first fueling compensation amount and a second fueling command corresponding to the second fuel based on the second fueling compensation amount,
wherein each of the first fueling compensation amount and the second compensation amount are based on at least one pressure within at least one cylinder of a plurality of cylinders within the internal combustion engine.

Q. The method of paragraph P, wherein determining the first fueling compensation amount for the first fuel comprises:
receiving, by the at least one controller, at least one signal corresponding to a sensed condition with the at least one cylinder;
based on the at least one signal, estimating an actual fueling amount within the internal combustion engine; and
determining the first fueling compensation amount based on the actual fueling amount.

R. The method of paragraph Q, wherein determining the second fueling compensation amount for the second fuel comprises:
estimating a first fueling amount for the first fuel based on the at least one fueling request;
estimating a second fueling amount for the second fuel based on the first fueling amount and the actual fueling amount; and
determining the second fueling compensation amount based on the second fueling amount.

S. The method of paragraph R, further comprising determining at least one first fueling command corresponding to the first fuel and at least one second fueling command corresponding to the second fuel, the at least one first fueling command being based on the first fuel compensation amount and the at least one second fueling command being based on the second fuel compensation amount.

T. The method of paragraph S, further comprising determining, by the at least one controller, at least one operating condition of the internal combustion engine; and
wherein the first fueling compensation amount and the second fueling compensation amount are based on the at least one operating condition.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such coupling can be mechanical, electrical, or fluidic.

It should be noted that the arrangement of various elements shown in the figures can differ according to other exemplary embodiments, and that such variations are intended to be encompassed by the present disclosure.

In some embodiments, hardware and data processing components used to implement the various processes, operations, illustrative logics, logical blocks, modules and circuits described in connection with the embodiments disclosed herein, such as hardware and data processing components of controller (e.g., a memory within the controller 18, a memory within the OEM system 12, a memory in the first fuel control system 14, or a memory within the second fuel control system 16), can be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor can be a microprocessor, or any conventional processor, controller, microcontroller, or state machine. A processor also can be implemented as a combination of computing devices, such as a combination of a DSP and a microprocessor, a plurality of microprocessors, one or more microprocessors in conjunction with a DSP core, or any other such configuration. In some embodiments, particular processes and methods can be performed by circuitry that is specific to a given function. The memory (e.g., memory, memory unit, storage device) can include one or more devices (e.g., RAM, ROM, Flash memory, hard disk storage) for storing data and/or computer code for completing or facilitating the various processes, layers and modules described in the present disclosure. The memory can be or include volatile memory or non-volatile memory, and can include database components, object code components, script components, or any other type of information structure for supporting the various activities and information structures described in the present disclosure. According to an exemplary embodiment, the memory (e.g., a memory within the controller 18, a memory within the OEM system 12, a memory in the first fuel control system 14, or a memory within the second fuel control system 16) is communicably connected to the processor via a processing circuit and includes computer code for executing (e.g., by the processing circuit or the processor) the one or more processes described herein.

The present disclosure contemplates methods and systems on any machine-readable media for accomplishing various operations, e.g., such as operations 105-135 of the method 100, operations 205-235 of the method 200, and operations 305-315 of the method 300. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description can illustrate a specific order of method steps, the order of such steps can differ from what is depicted and described, unless specified differently above. Also, two or more steps can be performed concurrently or with partial concurrence, unless specified differently above.

It is important to note that any element disclosed in one embodiment can be incorporated or utilized with any other embodiment disclosed herein. Although only one example of an element from one embodiment that can be incorporated or utilized in another embodiment has been described above, it should be appreciated that other elements of the various embodiments can be incorporated or utilized with any of the other embodiments disclosed herein.

What is claimed is:

1. A control system for an internal combustion engine, the internal combustion engine being structured to receive at least a first fuel, the control system comprising:
   at least one sensor configured to sense a condition within at least one cylinder within the internal combustion engine; and
   a controller operably connected to the at least one sensor, the controller configured to:
      receive at least one fueling request corresponding to at least the first fuel;
      send at least one fueling command to at least one injector within the internal combustion engine corresponding to the at least one fueling request;
      receive at least one signal from the at least one sensor corresponding to the condition;
      based on the at least one signal, estimate an actual fueling amount within the internal combustion engine; and
      determine at least one compensation amount corresponding to the at least one injector based on the actual fueling amount.

2. The control system of claim 1, wherein the internal combustion engine is a dual fuel engine configured to receive the first fuel and a second fuel differing from the first fuel.

3. The control system of claim 1, wherein the at least one signal indicates an internal pressure within the at least one cylinder.

4. The control system of claim 1, wherein the at least one signal indicates a gross indicated mean effective pressure.

5. The control system of claim 1, wherein the at least one signal includes a ratio of first pressure and a second pressure, the first pressure corresponding to an internal pressure within the at least one cylinder at a first crank angle and the second pressure corresponding to an internal pressure within the at least one cylinder at a second crank angle.

6. The control system of claim 1, wherein the controller is configured to estimate the actual fueling amount based on test data corresponding to the internal combustion engine.

7. The control system of claim 1, wherein the controller is further configured to update at least one fueling data repository with the at least one compensation amount.

8. The control system of claim 7, wherein the at least one fueling data repository is part of a cloud computing system.

9. The control system of claim 2, wherein the at least one compensation amount comprises a first amount and a second amount, the first amount corresponding to the first fuel and the second amount corresponding to the second fuel.

10. The control system of claim 9, wherein the controller is further configured to adjust a mode of the internal combustion engine from a dual fuel mode to a single fuel mode prior to receiving the at least one fueling request.

11. The control system of claim 9, wherein the controller is configured to adjust the mode of the internal combustion engine from the single fuel mode to the dual fuel mode after determining the at least one compensation amount.

12. An internal combustion engine system, the internal combustion engine system comprising:
   an internal combustion engine comprising:
      a plurality of cylinders;
      a first injector configured to inject a first fuel and a second injector configured to inject a second fuel into at least one cylinder of the plurality of cylinders; and
      a control system configured to control the internal combustion engine, the control system comprising at least one controller configured to:
         send at least one fueling command to at least one of the first injector or the second injector;
         estimate an actual fueling amount within the internal combustion engine based on a signal received from the at least one cylinder of the plurality of cylinders;
         estimate a fueling amount for the first fuel based on the actual fueling amount; and
         estimate a fueling amount for the second fuel based on at least one of the actual fueling amount or the fueling amount for the first fuel.

13. The internal combustion engine of claim 12, wherein the at least one controller is configured to estimate the actual fueling amount by calculating at least one of a cumulative apparent heat release amount, a gross indicated mean effective pressure, or a pressure ratio based on the signal from the at least one cylinder.

14. The internal combustion engine of claim 12, wherein the at least one controller is further configured to update at least one look-up table with the fueling amount for the second fuel.

15. The internal combustion engine of claim 13, wherein the signal indicates an internal pressure within the at least one cylinder of the plurality of cylinders, and wherein the controller is configured to calculate the gross indicated mean effective pressure within the internal combustion engine.

16. A method of controlling an internal combustion engine, the method comprising:
- receiving, by at least one controller, at least one fueling request;
- wherein the at least one fueling request comprises a first fueling request and a second fueling request, the first fueling request corresponding to a first fuel and the second fueling request corresponding to a second fuel;
- determining, by the at least one controller, a first fueling compensation amount for the first fuel;
- determining, by the at least one controller, a second fueling compensation amount for the second fuel; and
- determining, by the at least one controller, a first fueling command corresponding to the first fuel based on the first fueling compensation amount and a second fueling command corresponding to the second fuel based on the second fueling compensation amount,
- wherein each of the first fueling compensation amount and the second compensation amount are based on at least one pressure within at least one cylinder of a plurality of cylinders within the internal combustion engine.

17. The method of claim 16, wherein determining the first fueling compensation amount for the first fuel comprises:
- receiving, by the at least one controller, at least one signal corresponding to a sensed condition with the at least one cylinder;
- based on the at least one signal, estimating an actual fueling amount within the internal combustion engine; and
- determining the first fueling compensation amount based on the actual fueling amount.

18. The method of claim 17, wherein determining the second fueling compensation amount for the second fuel comprises:
- estimating a first fueling amount for the first fuel based on the at least one fueling request;
- estimating a second fueling amount for the second fuel based on the first fueling amount and the actual fueling amount; and
- determining the second fueling compensation amount based on the second fueling amount.

19. The method of claim 18, further comprising determining at least one first fueling command corresponding to the first fuel and at least one second fueling command corresponding to the second fuel, the at least one first fueling command being based on the first fuel compensation amount and the at least one second fueling command being based on the second fuel compensation amount.

20. The method of claim 19, further comprising determining, by the at least one controller, at least one operating condition of the internal combustion engine; and
- wherein the first fueling compensation amount and the second fueling compensation amount are based on the at least one operating condition.

* * * * *